United States Patent
Kondo (10) Patent No.: US 7,751,844 B2
(45) Date of Patent: Jul. 6, 2010

(54) MOBILE COMMUNICATION SYSTEM, RADIO BASE STATION, TRANSMISSION POWER CONTROL METHOD USED THEREIN, AND PROGRAM THEREOF

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 10/573,279

(22) PCT Filed: Sep. 24, 2004

(86) PCT No.: PCT/JP2004/014225

§ 371 (c)(1),
(2), (4) Date: Jan. 9, 2007

(87) PCT Pub. No.: WO2005/029731

PCT Pub. Date: Mar. 31, 2005

(65) Prior Publication Data

US 2007/0111744 A1    May 17, 2007

(30) Foreign Application Priority Data

Sep. 24, 2003    (JP) .............................. 2003-330827

(51) Int. Cl.
*H04B 7/00* (2006.01)
*H01Q 11/12* (2006.01)
*H04B 1/04* (2006.01)
*H04B 1/00* (2006.01)

(52) U.S. Cl. .................. 455/522; 455/127.1; 455/127.2; 455/69

(58) Field of Classification Search .................. 455/522, 455/561, 69, 127.2, 456.6, 13.4, 572, 574, 455/127.1, 127.4, 296, 298, 343.1, 232.1
See application file for complete search history.

(56) References Cited

U.S. PATENT DOCUMENTS 6,859,446 B1 * 2/2005 Gopalakrishnan et al. ... 370/335

(Continued)

FOREIGN PATENT DOCUMENTS

CN    1419346    5/2003

(Continued)

OTHER PUBLICATIONS

TSG-RAN Working Group 1, meeting #5, TSGR1 #5 (99)690, Cheju, South Korea, Jun. 1-4, 1999.

(Continued)

*Primary Examiner*—Eugene Yun
(74) *Attorney, Agent, or Firm*—Michael Best & Friedrich LLP (57) ABSTRACT

A radio transmission rate determining part (21) of a radio base station (2), when receiving transmission data transmitted from a base station control apparatus (1), determines a radio transmission rate in accordance with transmission data size and produces rate information. A transmission power changing part (22) decides the change amount of transmission power from the transmission data size received by the radio transmission rate determining part (21) and from an error correction gain difference determined in accordance with the transmission data size. A transmission frame producing part (23) encodes the transmission data into a transmission frame. A transmission part (249 transmits the transmission frame and rate information in accordance with the transmission power decided by the transmission power changing part (22).

15 Claims, 8 Drawing Sheets

U.S. PATENT DOCUMENTS

| | | | |
|---|---|---|---|
| 7,295,517 B2 * | 11/2007 | Anim-Appiah et al. | 370/232 |
| 7,328,037 B2 * | 2/2008 | Tsien et al. | 455/522 |
| 7,443,816 B2 * | 10/2008 | Chen et al. | 370/329 |
| 2002/0013157 A1 * | 1/2002 | Ichikawa | 455/522 |
| 2003/0232621 A1 * | 12/2003 | Brooks | 455/424 |
| 2004/0092233 A1 * | 5/2004 | Rudrapatna | 455/69 |
| 2006/0002338 A1 * | 1/2006 | Guo | 370/328 |

FOREIGN PATENT DOCUMENTS

| | | |
|---|---|---|
| JP | 11-17650 | 1/1999 |
| JP | 2001-44930 | 2/2001 |
| JP | 2001177470 | 6/2001 |
| JP | 2003-539236 | 9/2003 |
| JP | 2003319458 | 11/2003 |

OTHER PUBLICATIONS

Office Action, Japanese Patent Application No. 2005-514149, dated Oct. 20, 2008 (with English translation of relevant portions).

First Office Action dated Feb. 13, 2009, Chinese Patent Application No. 200480027605.4 (with English translation of relevant sections).

* cited by examiner

PRIOR ART

PRIOR ART

| TRANSMISSION DATA SIZE | ERROR CORRECTION GAIN DIFFERENCE (FER=1.E-0.2, REFERENCE VALUE: 3840 BITS) | CHANGE IN AMOUNT OF TRANSMISSION POWER |
|---|---|---|
| 80bit | 1.8dB | +1.8dB |
| 160bit | 1.3dB | +1.3dB |
| 320bit | 0.8dB | +0.8dB |
| 640bit | 0.4dB | +0.4dB |
| 1280bit | 0.2dB | +0.2dB |
| 2560bit | 0.1dB | +0.1dB |
| 3840bit | 0.0dB | +0.0dB |
| 5120bit | 0.0dB | +0.0dB |

FIG. 7

| TRANSMISSION DATA SIZE | ERROR CORRECTION GAIN DIFFERENCE (FER=1.E-0.3, REFERENCE VALUE: 3840 BITS) | CHANGE IN AMOUNT OF TRANSMISSION POWER |
|---|---|---|
| 80bit | 2.3dB | +2.3dB |
| 160bit | 1.7dB | +1.7dB |
| 320bit | 1.0dB | +1.0dB |
| 640bit | 0.7dB | +0.7dB |
| 1280bit | 0.3dB | +0.3dB |
| 2560bit | 0.1dB | +0.1dB |
| 3840bit | 0.0dB | +0.0dB |
| 5120bit | 0.0dB | +0.0dB |

MOBILE COMMUNICATION SYSTEM, RADIO BASE STATION, TRANSMISSION POWER CONTROL METHOD USED THEREIN, AND PROGRAM THEREOF

CROSS REFERENCE TO RELATED APPLICATIONS

This application claims the benefit of International Patent Application No. PCT/JP2004/014425, filed 24 Sep. 2004, which claims the benefit of Japanese Patent Application No. 2003-330827, filed 24 Sep. 2003.

TECHNICAL FIELD

The present invention relates to a mobile communication system, a radio base station, a transmission power control method used therein, and a program thereof, and more particularly, relates to a mobile communication system in which variable rate transmission is performed.

BACKGROUND ART

What is known as a mobile communication system is a system being composed of a base station control apparatus, a radio base station, and a mobile station like a CDMA (Code Division Multiple Access) radio network, in which variable rate transmission is performed over a downlink radio channel.

Figure 1:
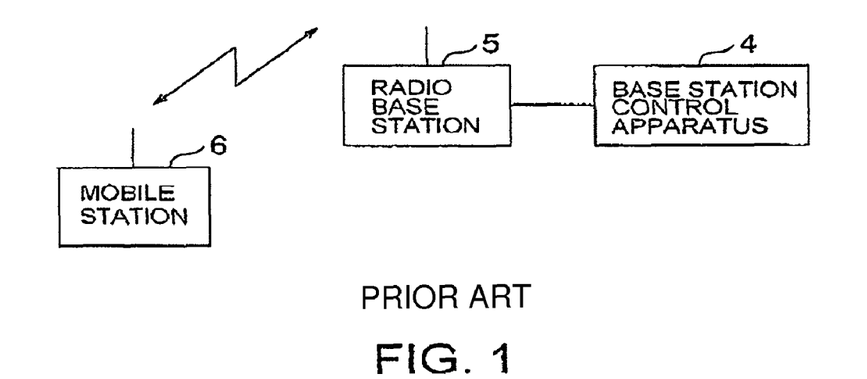
FIG. 1 is a block diagram showing a configuration of a mobile communication system.
Figure 2:
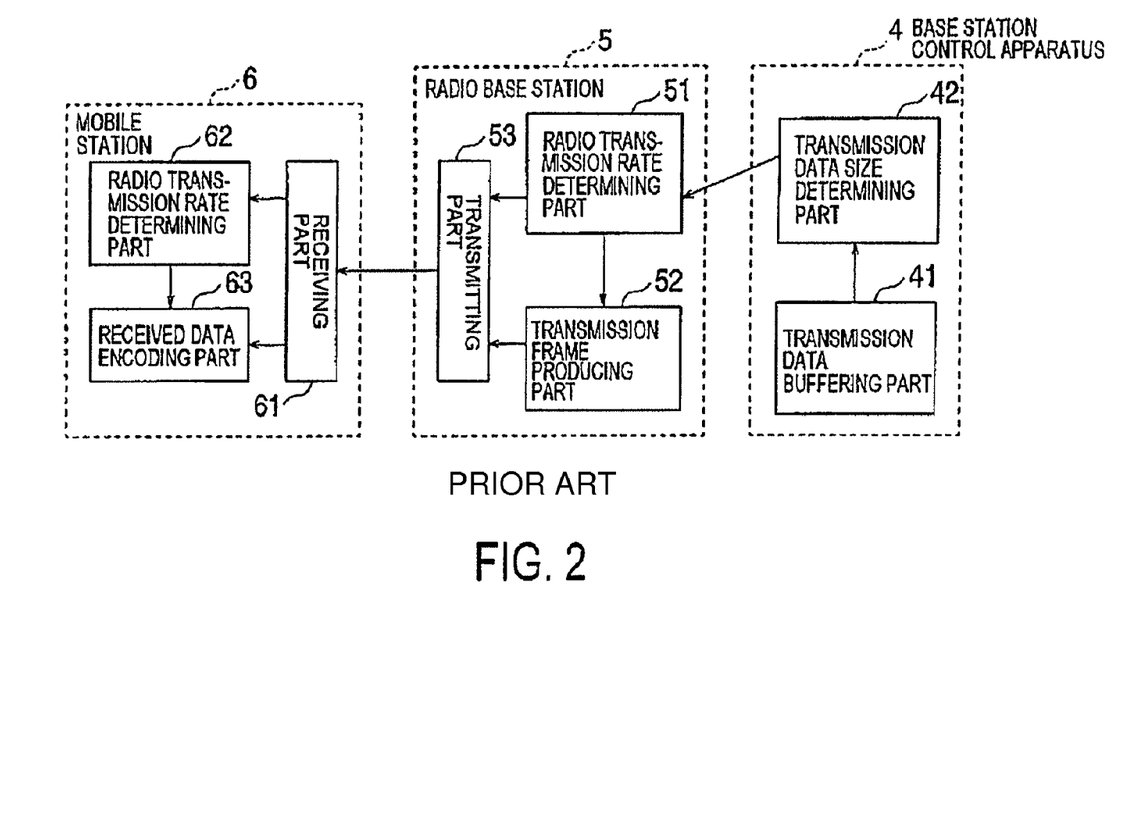
FIG. 2 is a block diagram showing a configuration of each of conventional base station control apparatus, radio base station and mobile station.

As illustrated in FIGS. 1 and 2, the present mobile communication system is composed of a base station control apparatus 4, a radio base station 5, and a mobile station 6.

In FIG. 2, the base station control apparatus 4 includes a transmission data buffering part 41 and a transmission data size determining part 42. The radio base station 5 includes a radio transmission rate determining part 51, a transmission frame producing part 52, and a transmitting part 53. The mobile station 6 includes a receiving part 61, a radio transmission rate determining part 62 and a received data decoding part 63.

Figure 3:
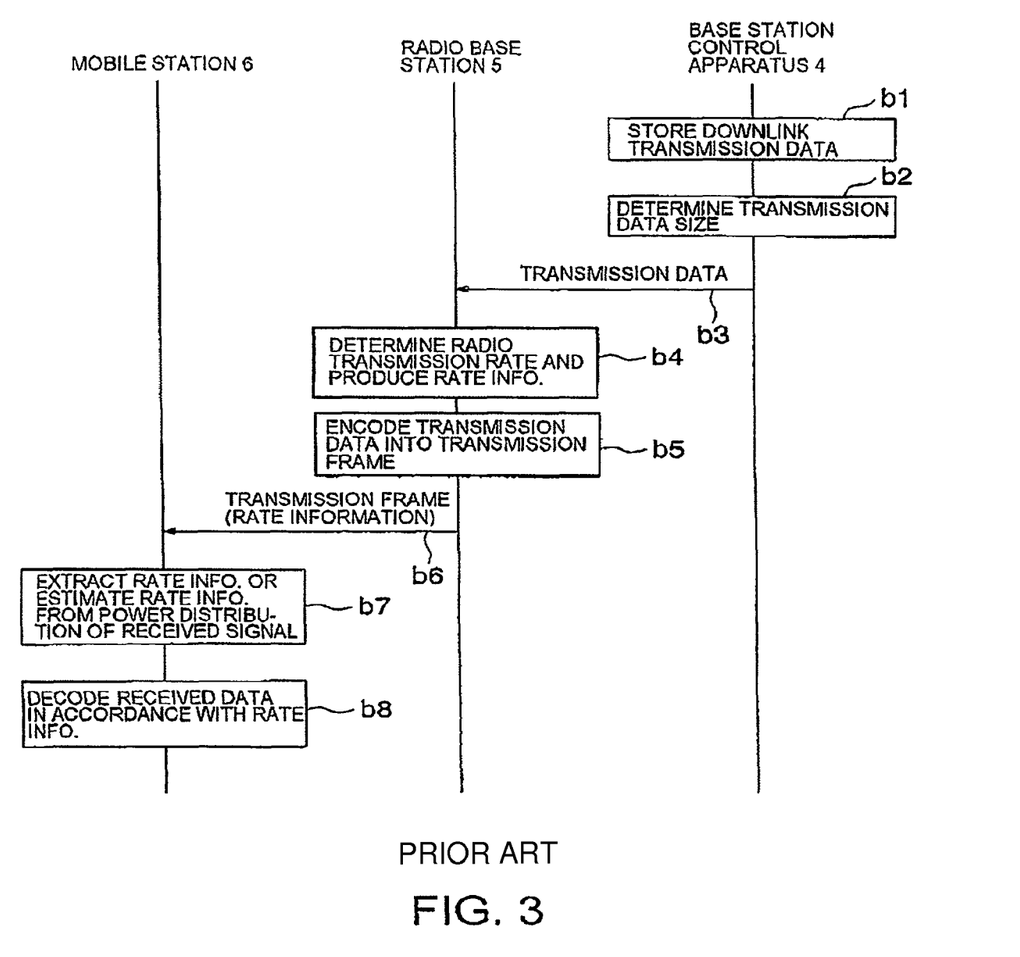
FIG. 3 is a sequence chart showing the operation of variable rate transmission in a conventional mobile communication system.

FIG. 3 is a sequence chart showing an operation flow of variable rate transmission by the mobile communication system shown in FIG. 2.

Variable rate transmission is described with reference to FIGS. 2 and 3. In the base station control apparatus 4, downlink transmission data is temporarily stored in the transmission data buffering part 41 (b1 in FIG. 3). The transmission data size determining part 42 determines a transmission data size in accordance with the volume of the data stored in the transmission data buffering part 41 (b2 in FIG. 3), and transmits the transmission data of the determined data size to the radio base station 5 (b3 in FIG. 3).

In the radio base station 5, receiving the transmission data transmitted from the base station control apparatus 4, the radio transmission rate determining part 51 determines a radio transmission rate in accordance with the transmission data size and produces rate information (b4 in FIG. 3). The transmission frame producing part 52 encodes the transmission data into a transmission frame (b5 in FIG. 3). The transmitting part 53 transmits the encoded transmission frame and the determined rate information to the mobile station 6 (b6 in FIG. 3).

In the mobile station 6, the receiving part 61 receives a signal transmitted from the radio base station 5. The radio transmission rate determining part 61 either extracts the rate information included in the signal received at the receiving part 61 or estimates rate information from the power distribution of the received signal (b7 in FIG. 3). The received data decoding part 63 decodes the received data in accordance with the rate information estimated by the radio transmission rate determining part 62 (b8 in FIG. 3).

In the above-described mobile communication system, the radio base station 5 determines a radio transmission rate in accordance with a transmission data size and produces rate information to transmit the transmission frame and the rate information to the mobile station 6. The mobile station 6 decodes the received data in accordance with the extracted rate information or the estimated rate information.

It is known that in the mobile transmission system as described above, an error correction gain differs depending on a transmission data size. This is disclosed, for example, in TSG-RAN Working Group 1 meeting #5 TSGR1 #5 (99) 690, Cheju, South Korea, Jun. 1-4, 1999.

Figure 4:
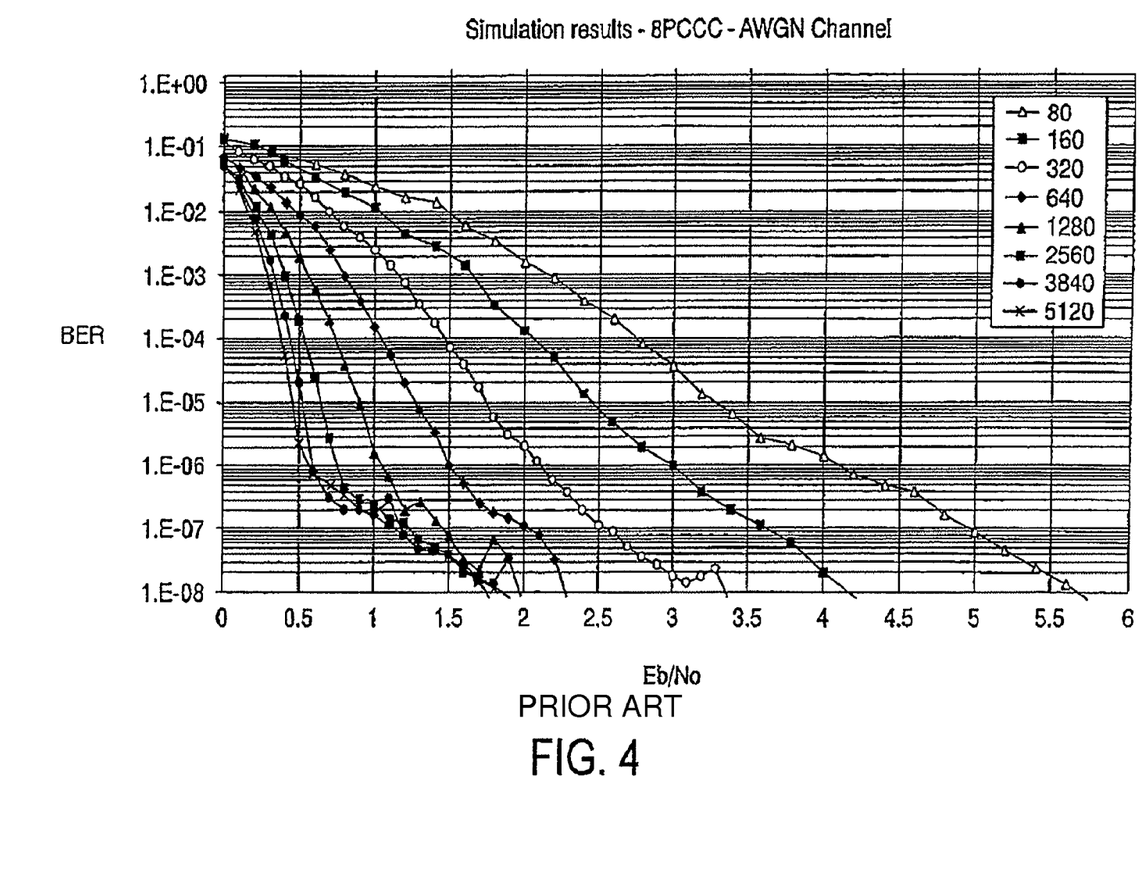
FIG. 4 is a characteristic view for explaining an error correction gain in accordance with a transmission data size.
Figure 5:
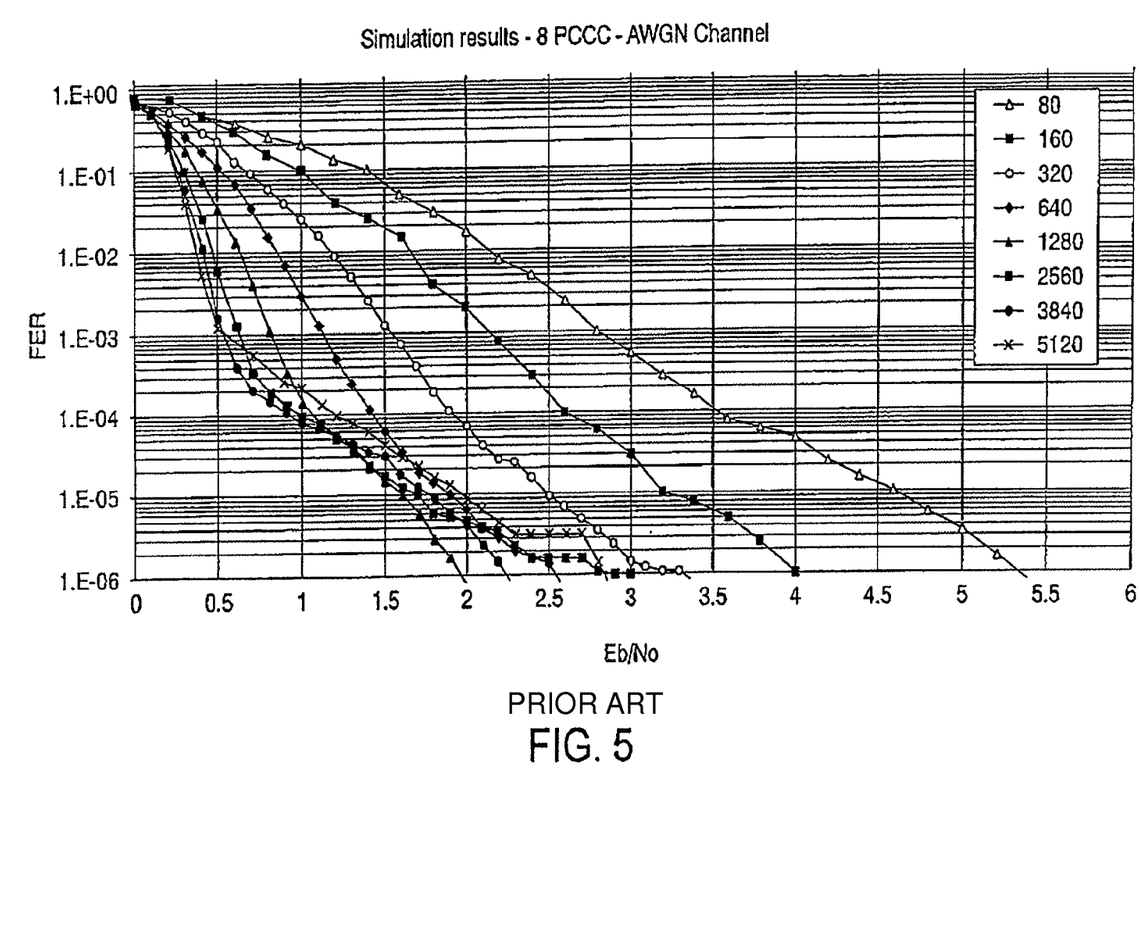
FIG. 5 is a characteristic view for explaining error correction gain in accordance with a transmission data size.

FIG. 4 shows the relation between each BER (Bit Error Rates) of 80, 160, 320, 640, 1280, 2560, 3840, and 5120 bits of the respective transmission data, and each Eb/No (Ratio of Energy per Bit to Noise Power Spectral Density) thereof. FIG. 5 shows the relation between each FER (Frame Error Rate) of 80, 160, 320, 640, 1280, 2560, 3840, and 5120 bits of respective transmission data, and each Eb/No thereof.

As evidenced by FIGS. 4 and 5, in the mobile communication system, if the transmission power from the radio base station 5 to the mobile station 6 is the same, the error rate of the small size of transmission data becomes higher than that of the large size of transmission data. This means that, if a transmission data size is small, a necessary error correction gain will not be obtained, causing degradation of reception quality of the mobile station.

It is a purpose of the present invention to provide a mobile communication system in which even if a transmission data size is small, a desired error correction gain can be obtained resulting in preventing the reception quality of the mobile station from deteriorating.

It is another purpose of the present invention to provide a radio base station for the mobile communication system.

It is yet another purpose of the present invention to provide a transmission power control method suited for the mobile communication system.

DISCLOSURE OF THE INVENTION

In a mobile communication system according to the present invention, variable rate transmission is performed over a downlink radio channel among a base station control apparatus, a radio base station and a mobile station. In the mobile communication system according to an aspect of the present invention, the radio base station includes a transmission rate determining part for determining a transmission rate in accordance with a size of transmission data to the mobile station, and a transmission power changing part for changing the transmission power of the transmission data in accordance with an error correction gain difference depending on the determined transmission rate.

The mobile base station according to the present invention is allocated between the base station control apparatus and the mobile station, in which variable rate transmission is performed over the downlink radio channel between the base station control apparatus and the mobile station. The radio base station according to an aspect of the present invention includes a transmission rate determining part for determining transmission rate in accordance with a size of transmission data to the mobile station, and a transmission power changing part for changing the transmission power of the transmission data in accordance with an error correction gain difference depending on the determined transmission rate.

In a transmission power control method according to the present invention, variable rate transmission is performed over a downlink channel among a base station control apparatus, a radio base station, and a mobile station. The transmission power control method according to an aspect of the present invention includes a step of determining a transmission rate in accordance with a size of transmission data to a mobile station, and a step of determining the transmission power of transmission data in accordance with an error correction gain difference depending on the determined transmission rate.

A program for a transmission power control method according to the present invention is a program for carrying out the transmission power control method in which variable rate transmission is performed over a downlink radio channel among a base station control apparatus, a radio base station and a mobile station. This program is executed in a computer at the radio base station, and makes the computer to perform a processing for determining a transmission rate in accordance with a size of transmission data to the mobile station, and a processing for determining the transmission power of transmission data in accordance with an error correction gain difference depending on the determined transmission rate.

In other words, in the mobile communication system according to the present invention, variable rate transmission is performed by the base station control apparatus, the radio base station, and the mobile station over a downlink radio channel. Further, by attaching rate information for specifying a transmission rate by each transmission frame in accordance with a user data size among the base station control apparatus, the radio base station and the mobile station, the present mobile communication system can be applied to the CDMA (Code Division Multiple Access) radio network in which variable rate control is performed. The radio base station changes a transmission rate in accordance with the user data size and also changes the transmission power in accordance with an error correction gain difference depending on the transmission rate. For example, the radio base station reduces the transmission power when a transmission rate is large, and increases the transmission power when the transmission rate is small.

In the mobile communication system according to the present invention, the error correction gain is amended, in case of variable rate transmission, so as not to become small due to a low transmission rate by increasing the transmission power, and this enables to stably maintain the communication quality. However, instead of attaching any rate information between the radio base station and a mobile station, it is allowed to estimate a transmission rate at the mobile station.

BEST MODE FOR CARRYING OUT THE INVENTION

Figure 6:
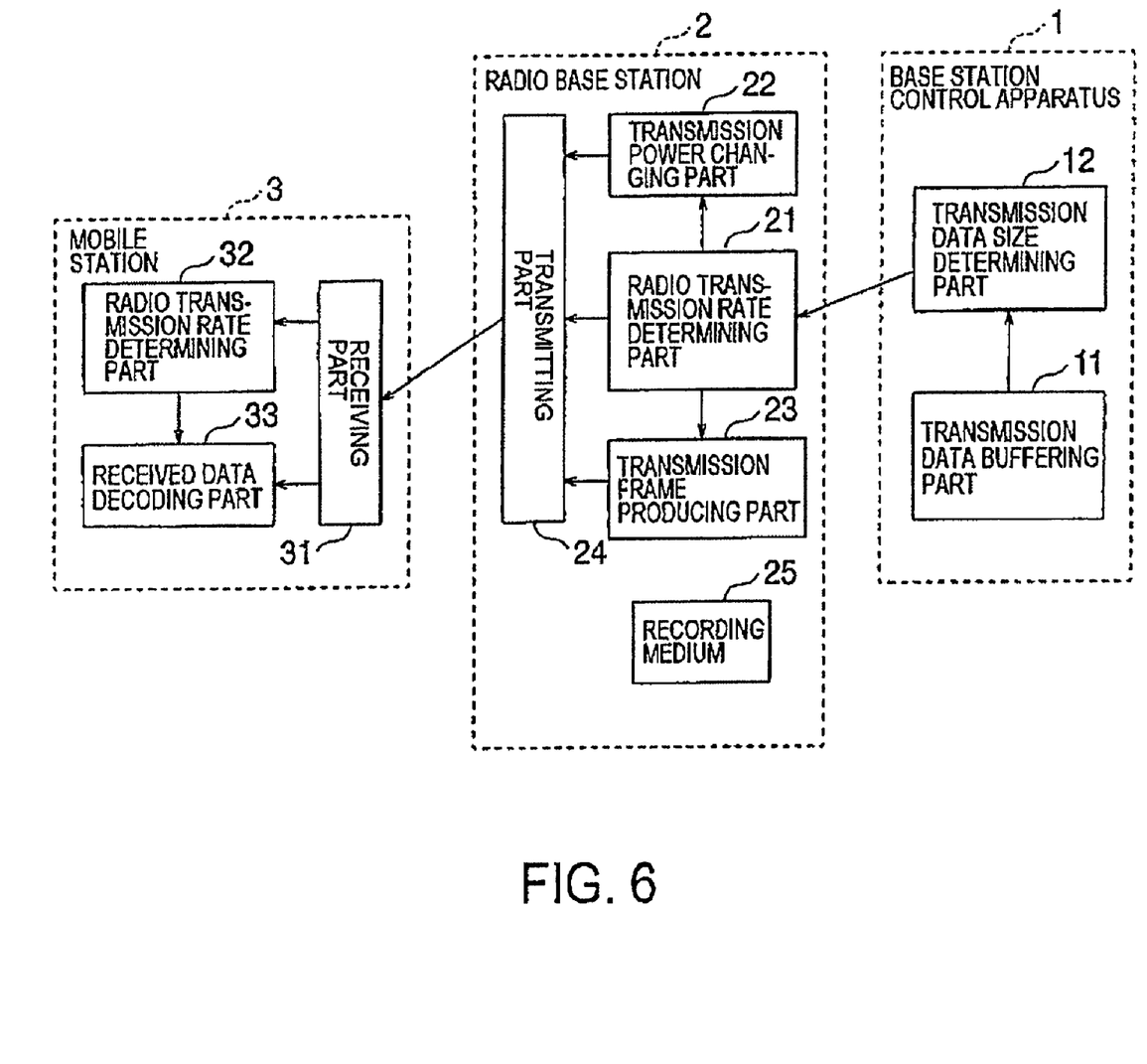
FIG. 6 is a block diagram showing a configuration of each of a base station control apparatus, a radio base station, and a mobile station, that configure a mobile communication system according to a preferred embodiment of the present invention.

Next, an embodiment of the present invention is described with reference to the drawings. FIG. 6 is a block diagram showing the configuration of a mobile communication system according to a preferred embodiment of the present invention. Particularly, FIG. 6 shows the configuration of the mobile communication system in which variable rate transmission is performed in a CDMA radio network. The mobile communication system is composed of a base station control apparatus 1, a radio base station 2, and a mobile station 3.

In the present embodiment, when data like in the Internet or the like is transferred to the mobile station 3 from the network, the transmission data is stored in the base station control apparatus 1. The base station control apparatus 1 transmits the transmission data to the radio base station 2 in accordance with the volume of the stored data.

The radio base station 2 determines a transmission rate of a radio channel in accordance with a size of the transmission data (block size) transmitted from the base station control apparatus 1. The radio base station 2 encodes the transmission data and transmits the encoded data at the determined transmission rate. In addition, as described later in detail, the radio base station 2 either increases or decreases the transmission power depending on an error correction gain difference in accordance with the transmission data size. The radio base station 2 can also notify the mobile station 3 of rate information.

The mobile station 3 receives data transmitted from the radio base station 2. The mobile station 3 also decodes the received data in accordance with the rate information transmitted from the radio base station 2 or the transmission rate obtained from estimation of the transmission rate of the downlink channel.

In FIG. 6, the base station control apparatus 1 includes a transmission data buffering part 11 and a transmission data size determining part 12. The transmission data buffering part 11 temporarily stores downlink transmission data. The transmission data size determining part 12 determines a transmission data size in accordance with the volume of data stored in the transmission data buffering part 11 and transmits the transmission data of the determined size to the radio base station 2.

The radio base station 2 includes a radio transmission rate determining part 21, a transmission power changing part 22, a transmission frame producing part 23, a transmitting part 24, and a recording medium 25. The recording medium 25 stores a program (computer executable program) for carrying out operations of the respective parts of the radio base station 2. In other words, a computer composing the radio base station 2 reads out the program stored in the recording medium 25 and executes the operations later-described on the basis of the program read out by the computer, thereby realizing the functions of the radio transmission rate determining part 21, those of the transmission power changing part 22, and those of the transmission frame producing part 23.

Receiving the transmission data transmitted from the base station control apparatus 1, the radio transmission rate determining part 21 determines a radio transmission rate in accordance with the transmission data size, and produces rate information. Receiving the transmission data size received by the radio transmission rate determining part 21, the transmission power changing part 22 increases or decreases the transmission power in accordance with the transmission data size and the error correction gain difference that can be obtained in accordance with the transmission data size.

Figure 7:
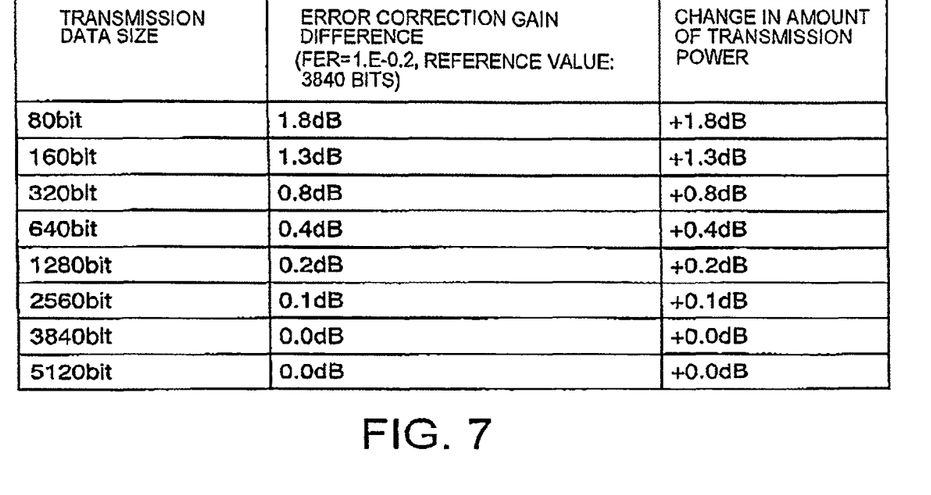
FIG. 7 is a view showing an example of a reference table to be used for change in the transmission power that is performed at the transmission power changing part shown in FIG. 6.
Figure 8:
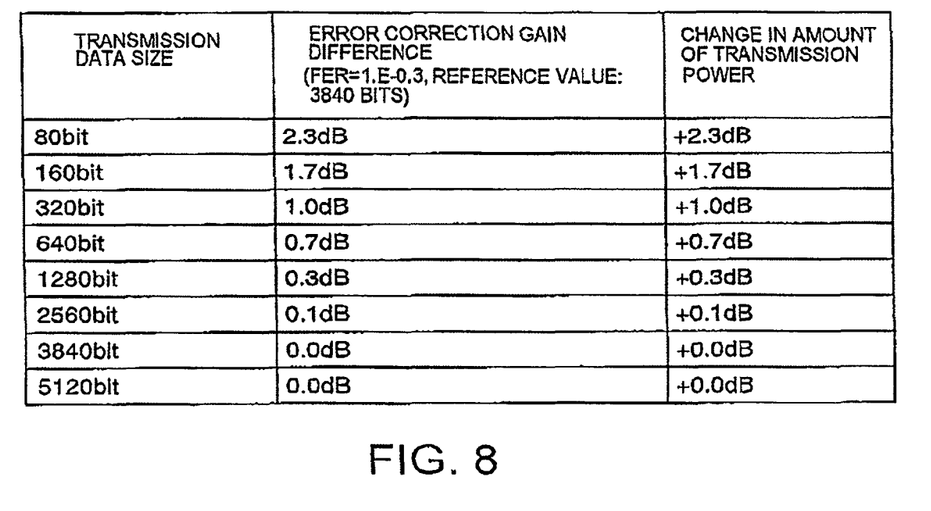
FIG. 8 is a view showing another example of a reference table to be used for change in transmission power that is performed at the transmission power changing part shown in FIG. 6.

With reference to FIGS. 7 and 8, there will be provided a description of an example of the method of increase and decrease in the transmission power performed at the transmission power changing part 22.

FIGS. 7 and 8 show the tables of increased and decreased amounts of the transmission power prepared based on the relation between the FER and the Eb/No as shown in FIG. 5, and show the relation between the error correction gain difference and increased and decreased amounts of the transmission power by each transmission data size. In particular, FIG. 7 shows the table in case that the FER is 1.E-02 (=0.01) on the basis of 3840 bits of the transmission data size. Meanwhile, FIG. 8 shows the table in case that the FER is 1.E-03 (=0.001) on the basis of 3840 bits of the transmission data size. For example, in the table of FIG. 7, where the transmission data size is 80 bits and the error correction gain difference is 1.8 dB, the transmission power is increased by 1.8 dB. Also, since the basic size of transmission data is 3840 bits, if the transmission data size is 3840 or 5120 bits, an increased amount of the transmission power may be 0.

Such a method of referring to a plurality of tables of increased and decreased amounts is just an example. The present invention is not limited to this method, and the increased and decreased amounts of the transmission power may also be obtained by calculation.

The transmission frame producing part 23 encodes the transmission data into a transmission frame. The transmitting part 24 transmits the transmission frame and the rate information in accordance with the transmission power determined at the transmission power changing part 22.

The mobile station 3 includes a receiving part 31, a radio transmission rate determining part 32, and a received data decoding part 33. The receiving part 31 receives a signal transmitted from the radio base station 2. The radio transmission rate determining part 32 extracts the rate information included in the received signal. The radio transmission rate determining part 32 may also estimate the rate information from the power distribution of the received signal at the receiving part 31, instead of extracting the rate information included in the received signal. The received data decoding part 33 decodes the received data in accordance with the rate information obtained by the radio transmission rate determining part 32.

As described above, in the mobile communication system according to the present invention, the variable rate control is performed by attaching the rate information for specifying a transmission rate by each transmission frame in accordance with a transmission data size among the base station control apparatus 1, a radio base station 2, and a mobile station 3.

Figure 9:
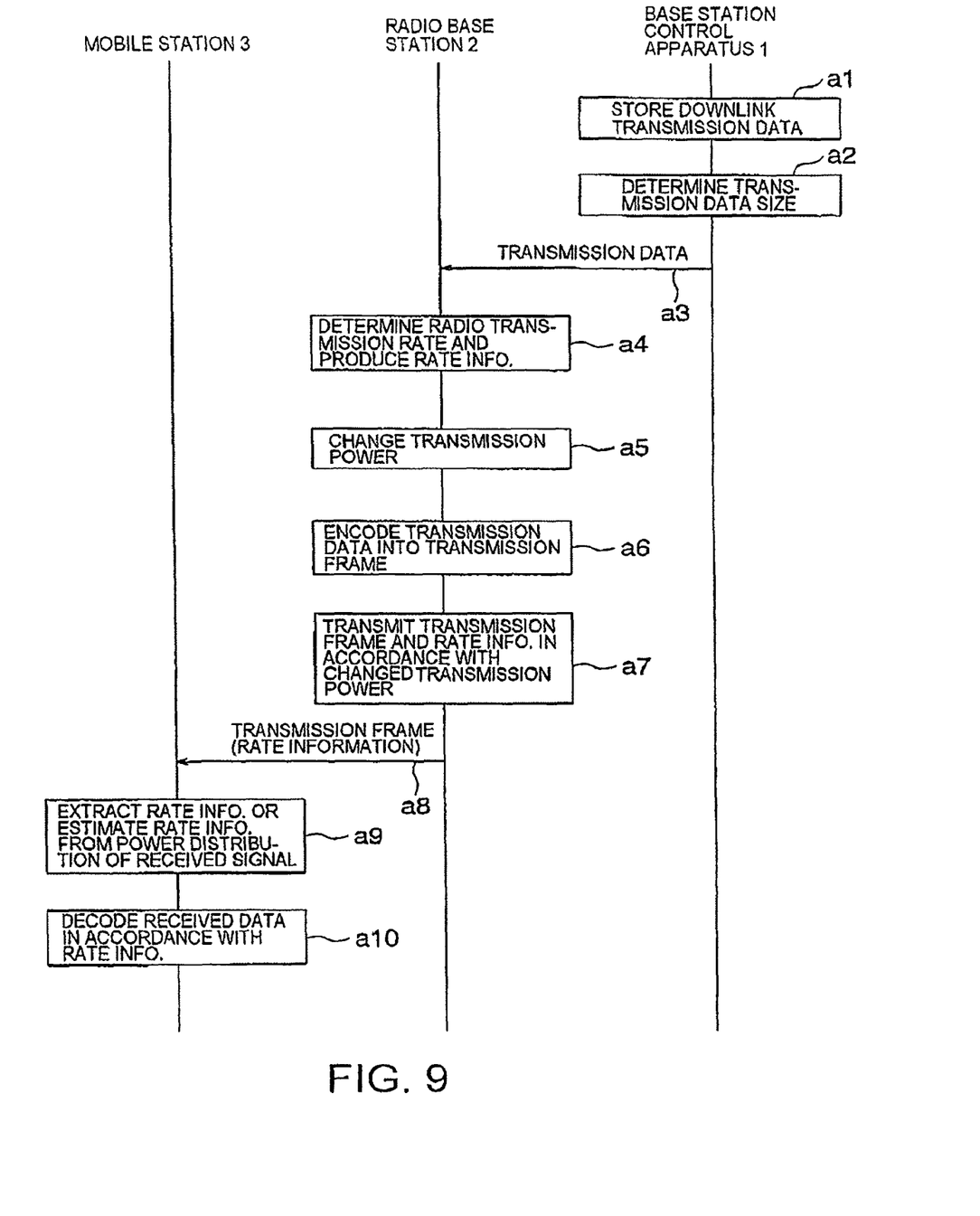
FIG. 9 is a sequence chart showing the operation of variable rate transmission in the mobile communication system shown in FIG. 6.

FIG. 9 is a sequence chart for explaining operations of the mobile communication system as shown in FIG. 6.

With reference to FIGS. 6 and 9, there will be provided a description of a transmission power control method in the mobile communication system according to the preferred embodiment of the present invention. Now, the operations of the radio base station 2 as shown in FIG. 9 can be realized by allowing the computer composing the radio base station 2 to read out and execute the program stored in the recording medium 25.

The base station control apparatus 1 temporarily stores downlink transmission data in the transmission data buffering part 11 (a1 in FIG. 7). The transmission data size determining part 12 determines a transmission data size (block size) in accordance with the data volume stored in the transmission data buffering part 11 (a2 in FIG. 7). The base station control apparatus 1 transmits the transmission data of the determined data size to the radio base station 2 (a3 in FIG. 7).

In the radio base station 2, the radio transmission rate determining part 21 receives the transmission data transmitted from the base station control apparatus 3. The radio transmission rate determining part 21 determines a radio transmission rate in accordance with the transmission data size and produces the rate information (a4 in FIG. 7). The transmission power changing part 22 determines a change amount of the transmission power based on a size of the transmission data received by the radio transmission rate determining part 21 and an error correction gain difference obtained in accordance with the transmission data size (a5 in FIG. 7).

The transmission frame producing part 23 encodes the transmission data into a transmission frame (a6 in FIG. 7). The transmitting part 24 transmits the encoded transmission frame and the produced rate information in accordance with the transmission power determined at the transmission power changing part 22 (a7 and a8 in FIG. 7). Here, the radio base station 2 changes the transmission rate in accordance with the size of user data, and at the same time, also changes the transmission power in accordance with an error correction gain difference depending on the transmission rate. For example, the radio base station 2 reduces the transmission power when the transmission rate is large, and increases the transmission power when the transmission rate is small.

The mobile station 3 receives a signal transmitted from the radio base station 2 at the receiving part 31. The radio transmission rate determining part 32 either extracts the rate information included in the received signal or estimates the rate information from the power distribution of the received signal at the receiving part 31 (a9 in FIG. 7). The received data decoding part 33 decodes the received data in accordance with the rate information obtained by the radio transmission rate determining part 32.

As described above, in the present embodiment, an error correction gain is amended so as not to become small due to a low transmission rate, in case of variable rate transmission, by increasing the transmission power, and thereby, it enables to stably maintain the communication quality. Even if a transmission data size is small, this will enable to prevent reception quality at the base station from being degraded.

INDUSTRIAL APPLICABILITY

The present invention is applicable not only to a CDMA radio network but also to any other mobile communication system as long as variable rate control is available.

The invention claimed is:

1. A mobile communication system in which variable rate transmission is performed over a downlink radio channel among a base station control apparatus, a radio base station, and a mobile station, the radio base station comprising:

a transmission rate determining part for determining a transmission rate in accordance with a size of transmission data to the mobile station; and a transmission power changing part for changing a transmission power of the transmission data in accordance with a predicted error correction gain difference depending on the determined transmission rate, the transmission power changing part being provided with one or more tables prepared in advance that show the relations among the size of the transmission data, the error correction gain difference, and a change amount of the transmission power, such that the changing of the transmission power is carried out with reference to the one or more tables.

2. The mobile communication system according to claim 1, wherein the transmission power changing part reduces the transmission power when the transmission rate is large, and increases the transmission power when the transmission rate is small.

3. The mobile communication system according to claim 1, wherein variable rate control is performed by attaching rate information specifying a transmission rate by each transmission frame in accordance with the transmission data size among the base station control apparatus, the radio base station and the mobile station.

4. The mobile communication system according to claim 1, wherein the mobile station includes a transmission rate determining part for estimating a transmission rate from a power distribution of a received signal.

5. The mobile communication system according to claim 1, that is applicable to a CDMA (Code Division Multiple Access) radio network in which variable rate transmission is performed over a downlink channel.

6. A radio base station that is allocated between a base station control apparatus and a mobile station, wherein variable rate transmission is performed over a downlink radio channel between the base station control apparatus and the mobile station, the radio base station comprising:

a transmission rate determining part for determining a transmission rate in accordance with a size of transmission data to the mobile station; and a transmission power changing part for determining a transmission power of the transmission data in accordance with a predicted error correction gain difference depending on the determined transmission rate, the transmission power changing part being provided with one or more tables prepared in advance that show the relations among the size of the transmission data, the error correction gain difference, and a change amount of the transmission power, such that the changing of the transmission power is carried out with reference to the one or more tables.

7. The radio base station according to claim 6, wherein the transmission power changing part reduces the transmission power when the transmission rate is large, and increases the transmission power when the transmission rate is small.

8. The radio base station according to claim 6, further comprising:

a transmission frame producing part for encoding the transmission data into a transmission frame; and a transmitting part for transmitting the determined transmission rate and the encoded transmission frame in accordance with the determined transmission power.

9. The radio base station according to claim 6, that is applicable to a CDMA (Code Division Multiple Access) radio network in which variable rate transmission is performed over a downlink radio channel.

10. A transmission power control method for a mobile communication system in which variable rate transmission is performed over a downlink radio channel among a base station control apparatus, a radio base station and a mobile station, the method comprising the steps of:

determining a transmission rate in accordance with a size of transmission data to the mobile station; and determining a transmission power of the transmission data in accordance with a predicted error correction gain difference depending on the determined transmission rate, the step of determining the transmission power being carried out with reference to one or more tables prepared in advance that show the relations among the size of the transmission data, the error correction gain difference, and a change amount of the transmission power.

11. The transmission power control method according to claim 10, wherein the step of determining the transmission power reduces the transmission power when the transmission rate is large, and increases the transmission power when the transmission rate is small.

12. The transmission power control method according to claim 10, wherein variable rate control is performed by attaching rate information specifying a transmission rate by each transmission frame in accordance with the transmission data size among the base station control apparatus, the radio base station, and the mobile station.

13. The transmission power control method according to claim 10, wherein a transmission rate is estimated at the mobile station from a power distribution of a received signal.

14. The transmission power control method according to claim 10, that is applicable to a CDMA (Code Division Multiple Access) radio network in which variable rate transmission is performed over a downlink radio channel.

15. A computer-readable medium having stored thereon a computer-executable program for executing a transmission power control method in which variable rate transmission is performed over a downlink radio channel among a base station control apparatus, a radio base station and a mobile station, the program being executed in a computer at the radio base station, the program for making the computer to perform a processing for determining:

a transmission rate in accordance with a size of transmission data to the mobile station; and a transmission power of transmission data in accordance with a predicted error correction gain difference depending on the determined transmission rate, the determining of the transmission power being carried out with reference to one or more tables prepared in advance that show the relations among the size of the transmission data, the error correction gain difference, and a change amount of the transmission power.

* * * * *